Figure 1:
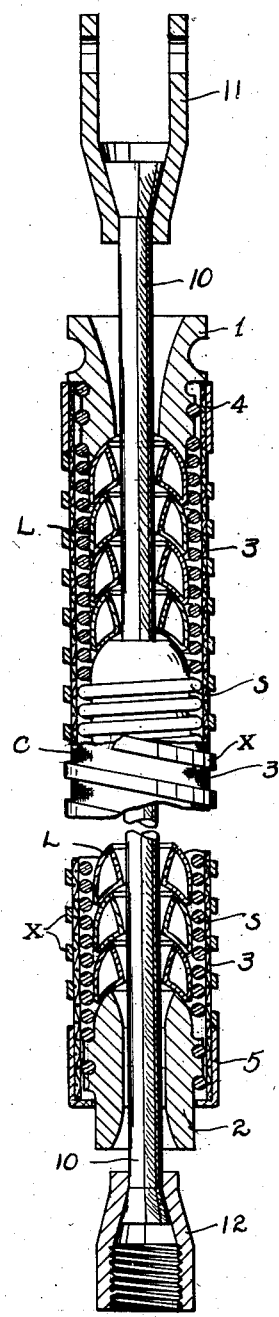

Dec. 15, 1931. J. SNEED 1,836,822
UNIT FOR FLEXIBLE CONDUITS
Filed May 21, 1928

Inventor
John Sneed
By Bates, Macklin, Gohrick & Teare
Attorneys

Patented Dec. 15, 1931

1,836,822

UNITED STATES PATENT OFFICE

JOHN SNEED, OF DETROIT, MICHIGAN, ASSIGNOR TO THE MIDLAND STEEL PRODUCTS COMPANY, OF CLEVELAND, OHIO, A CORPORATION OF OHIO

UNIT FOR FLEXIBLE CONDUITS

Application filed May 21, 1928. Serial No. 279,222.

This invention relates to units or links for flexible conduits and to the method of making such links or units.

In my copending application Serial No. 51,094 filed August 19th, 1925 I have described in detail a flexible conduit composed of interfitting links and have there dwelt fully on the configuration of the several links. My present invention is concerned with a novel link which may for the sake of illustration have the same shape as the links illustrated and described in my copending application but the present links are formed in a novel manner and are made of sheet stock so that each of the links is hollow.

It is among the objects of my invention to produce a flexible conduit formed of interfitting links, of which each link is hollow so that the assembled conduit will be of light weight. Another object is to provide conduit links which are less expensive than links heretofore known. A further object is to form such links of sheet stock and work and draw the links in a manner consistent with economical and efficient production.

Other objects will appear from the following description of the unit per se and the steps in the method of manufacturing such units, reference being had to the accompanying drawing in which a preferred form of the article is disclosed. The essential characteristics are summarized in the claims.

In the drawing the figure is a partial broken longitudinal section of a conduit comprising my novel hollow links.

Referring particularly to the figure, I show an assembled conduit which is similar to that described in my copending application mentioned above. Briefly stated the conduit comprises end members 1 and 2 between which a plurality of links L are held compressed upon each other by an encircling coil spring S. The spring S is secured at its ends to the end members 1 and 2. Surrounding the spring is a suitable dust cover 3 which is secured to the end members by such means as ferrules 4 and 5. The cover 3 may also serve to contain lubricant in the conduit and is supported by a coil spring X. The conduit acts in cooperation with a cable 10; the cable serving as a tension element while the conduit serves as a compression element in a flexible force transmitting device. Suitable yokes or connecting members 11 and 12 are joined to the ends of the cable and may be attached to external devices between which force in tension is transmitted.

As described more fully in my copending application, each of the links L may have one concave and one convex spherical end wall of which the spheres defining the end walls have centers lying in the surfaces of adjacent spheres. An integral cylindrical exterior side wall joins the end walls. Each of the links L has a central aperture for the reception of the cable 10. The central aperture has its walls flared toward the convex surface of the unit so that when the conduit is in maximum curvature the cable will be supported along a continuous line in the plane of curvature in the conduit. The intersection of the inner wall of the link L with a longitudinal plane defines a curve whose radius is substantially equal to a maximum radius of curvature of the conduit less the radius of the cable and whose center lies in a line which is the perpendicular bisector of the line which joins the centers of the spheres which define the concave and convex end walls of the unit.

While the foregoing describes the particular unit used in my copending application those skilled in the art will appreciate that the precepts of my present invention are broader than the specific illustration and that the advantages of the hollow link are applicable to structures other than that of my copending application, which in the present instance, illustrates a preferred embodiment and application of my invention.

Thus the curved end walls constitute bearing surfaces upon which adjacent links slide upon each other while the side wall and the wall of the central aperture sustain the link in compression and transmit compressive loads from one end wall to another and thus from one link to another throughout the conduit. Each link is formed of one piece of stock which is suitably drawn and pressed as is more fully set forth in my copending divisional application Ser. No. 374,255, filed June 27, 1929.

From the foregoing it will appear that I have provided a hollow conduit unit which can be cheaply made and which will have all the strength necessary for any desired use. While I have described a preferred form of my invention, I do not care to be limited other than by the claims appended hereto.

I claim:—

1. A unit for flexible conduit formed of a single piece of sheet stock having a hollow body portion with a longitudinal passageway, one end wall of the unit being integral with the wall of the passageway and the other end wall overlapping the end of the wall of the passageway.

2. A pressed metal unit having one concave and one convex end wall and a central aperture with longitudinally extending side walls defining the aperture being integral with the concave end wall and in abutting relation with the convex end wall.

3. A pressed metal unit formed of sheet stock having a generally cylindrical side wall, a concave and a convex end wall and a central aperture extending coaxial with the side wall and whose walls terminate at the end walls and join the concave end wall where the aperture has its least dimension and are flared to greatest dimension adjacent the convex end wall.

4. A hollow unit for flexible conduit formed of sheet stock having curved end walls formed integrally with an outer side wall and spaced from each other by an inner annular wall.

5. A hollow unit for flexible conduit formed of sheet stock having curved end walls, an outer side wall formed integrally with the end walls and an inner annular wall formed integrally with at least one of said end walls and spacing the inner portions of the end walls apart.

6. A hollow unit for withstanding compressive loads formed of sheet stock with curved end walls spaced from each other and supported by annular coaxial longitudinally extending walls one of the end walls being formed integrally with both of the said longitudinally extending walls.

7. A hollow unit for flexible conduit pressed from sheet stock having a substantially cylindrical outer side wall of which one end is turned inwardly to form a curved load bearing surface having a central aperture, and a central inner wall formed integrally with the outer wall and having its end flared outwardly to engage and support the said curved load bearing surface adjacent the aperture formed therein.

8. A hollow unit for flexible conduit pressed from sheet stock having a substantially cylindrical outer side wall of which one end is turned inwardly to form a convex curved load bearing surface having a central aperture, a central inner wall, and a concave end wall formed integrally with said inner and outer walls, said inner wall having its end flared outwardly to engage and support the said convex curved load bearing surface adjacent the aperture formed therein.

9. A hollow unit for flexible conduit formed of sheet stock having one convex and one concave substantially spherically formed end walls, said end walls being struck from centers lying in the longitudinal axis of the unit, said unit also having at least one annular longitudinally extending wall lying coaxial of the longitudinal axis of the unit and integrally joined to said end walls and spacing them from each other.

10. A hollow unit for flexible conduit withstanding compressive loads formed of sheet stock with curved end walls spaced from each other and supported by annular coaxial longitudinally extending walls one of the end walls being formed integrally with one of said longitudinally extending walls and the other end wall being formed integrally with the other of said longitudinally extending walls.

11. A hollow unit for flexible conduit formed of sheet stock having a convex and a concave end wall spaced apart and supported by inner and outer coaxial longitudinally extending walls, the convex end wall being integral with the outer longitudinal wall and the concave end wall being integral with at least the inner longitudinal wall.

In testimony whereof, I hereunto affix my signature.

JOHN SNEED.